United States Patent
Go

(10) Patent No.: US 9,114,841 B2
(45) Date of Patent: Aug. 25, 2015

(54) BICYCLE HAVING A POWER TRANSMISSION DEVICE

(71) Applicant: Jong-Hwa Go, Ulsan (KR)

(72) Inventor: Jong-Hwa Go, Ulsan (KR)

( * ) Notice: Subject to any disclaimer, the term of this patent is extended or adjusted under 35 U.S.C. 154(b) by 0 days.

(21) Appl. No.: 14/366,655

(22) PCT Filed: Feb. 25, 2013

(86) PCT No.: PCT/KR2013/001471
§ 371 (c)(1),
(2) Date: Jun. 18, 2014

(87) PCT Pub. No.: WO2013/133559
PCT Pub. Date: Sep. 12, 2013

(65) Prior Publication Data
US 2014/0361510 A1  Dec. 11, 2014

(30) Foreign Application Priority Data
Mar. 7, 2012  (KR) ........................ 10-2012-0023144

(51) Int. Cl.
| | | |
|---|---|---|
| *B62M 11/16* | (2006.01) | |
| *B62K 1/00* | (2006.01) | |
| *B62M 1/36* | (2013.01) | |
| *B62M 1/38* | (2013.01) | |

(52) U.S. Cl.
CPC .. *B62K 1/00* (2013.01); *B62M 1/36* (2013.01); *B62M 1/38* (2013.01); *B62M 11/16* (2013.01)

(58) Field of Classification Search
CPC ............ B62K 1/00; B62M 1/36; B62M 11/16
See application file for complete search history.

(56) References Cited

U.S. PATENT DOCUMENTS

| 1,494,504 | A | * | 5/1924 | Robbins | ........................ 280/205 |
|---|---|---|---|---|---|
| 4,062,558 | A | * | 12/1977 | Wasserman | ................... 280/205 |
| 6,152,471 | A | | 11/2000 | Kang et al. | |
| 6,315,690 | B1 | | 11/2001 | Myers, Sr. | |
| 7,762,569 | B2 | | 7/2010 | Fraser | |
| 2003/0228961 | A1 | * | 12/2003 | Huang | ........................ 482/110 |
| 2009/0085320 | A1 | * | 4/2009 | Fraser | ........................ 280/205 |
| 2011/0041635 | A1 | * | 2/2011 | Liu et al. | ........................ 74/319 |

FOREIGN PATENT DOCUMENTS

| JP | 2002-127979 A | 5/2002 |
|---|---|---|
| KR | 1998-033413 A | 7/1998 |
| KR | 20-0196397 Y1 | 9/2000 |
| KR | 10-2008-0051782 A | 6/2008 |
| KR | 10-2009-0103857 A | 10/2009 |
| KR | 10-2011-0028418 A | 3/2011 |
| KR | 10-1080740 B1 | 11/2011 |
| KR | 10-2011-0131440 A | 12/2011 |
| KR | 10-12220639 B1 | 1/2013 |

* cited by examiner

*Primary Examiner* — Kevin Hurley
(74) *Attorney, Agent, or Firm* — Bret E. Field; Bozicevic, Field & Francis LLP

(57) ABSTRACT

The present invention concerns a pedal cycle which is devised in such a way that, in order to improve on the fact that principally with unicycles the rider cannot easily mount, the space inside the hub is provided with a plurality of rollers for dividing up and receiving the weight transmitted to the frame at a downwardly widening angle rather than in the center of the wheel, and a geared drive force is transmitted to the wheel via a gear coupled to a pedal shaft passing through one end of the rollers.

3 Claims, 4 Drawing Sheets

BICYCLE HAVING A POWER TRANSMISSION DEVICE

CROSS-REFERENCE TO RELATED APPLICATION

This Application is a Section 371 National Stage Application of International Application No. PCT/KR2013/001471, filed Feb. 25, 2013, the contents of which is hereby incorporated by reference in its entirety.

BACKGROUND OF THE INVENTION

1. Technical Field

The present invention relates to a unicycle or a front-wheel drive bicycle, and relates to a bicycle which is advantageous in balancing and is more stable and convenient in a posture in which pedals are pressed down and which has solved a difficulty of riding a unicycle by making the number of revolutions of a wheel, rotated by the driving of the pedals, greater than the number of revolutions of the pedals. In this specification, the term "bicycle" is a term including a "unicycle."

2. Background Art

In implementing and manufacturing a transmissible bicycle having improved stability, which is to be implemented in Korean Patent Application No. 10-2009-0086196 (filed on Sep. 12, 2009), a device in which claim 1 and claim 2 of the Korean Patent Application No. 10-2009-0086196 have been harmoniously combined has been devised, and is based on priority of Korean Patent Application No. 10-2012-0023144.

DISCLOSURE

Technical Problem

In general, a lot of practice is required to use a unicycle. Furthermore, the unicycle has not become popularized although the portability of the unicycle is convenient because it is difficult for a person who has learnt to use the unicycle to increase the speed and it is difficult to install a brake device, etc. Accordingly, a major object is to solve the two problems.

Technical Solution

A major object of a two-wheel bicycle is to overcome falling left or right when a rider rides on the bicycle and starts, whereas in a unicycle, when the unicycle is started and during riding, it is necessary to overcome falling forward or backward. To this end, a lot of practice is required. The reason that it is easy to fall forward or backward in the unicycle is as follows. A first reason for this is that a point at which a frame meets a wheel is a single point, and thus, the range in which balance can be kept is very narrow because falling force is effected when the center of gravity of a rider deviates from the point. A second reason for this is that the number of revolutions of pedals is the same as the number of revolutions of the wheel, and thus, it is difficult to adjust the balance again by rapidly moving the bicycle within the range in which the balance may be kept when the balance is broken because the distance that the bicycle moves forward when the pedals are pressed down is small. Accordingly, a solution of the present invention is to apply the weight of a rider, applied to a frame, to two points or more through a plurality of rollers installed in a hub and placed lower than the center of the wheel without concentrating the weight of the rider on a single point of the center of the wheel so that a feeling of stability is increased and the range in which the balance can be kept is extended, to dispose a pedal shaft that transfers power to the wheel under the front of the center of the wheel, that is, the position where keeping the balance is good, and pedaling is ergonomically convenient, and to make the number of revolutions of the wheel greater than the number of revolutions of the pedals so that balance is easily secured and efficient driving is enabled.

Advantageous Effect

Korean Patent Application No. 10-2006-0123422 and Korean Utility Model No. 200196397 have implemented a structure that enables transmission, but have problems in that they are incomplete and riding is difficult because left and right pedals are separated. The present invention has improved the problems. Furthermore, Korean Patent Application No. 10-2009-0086194 (filed on Sep. 12, 2009) has a handy structure in representing the principle of the invention, but a transmission process is not simple. The present invention does not have such problems because a wheel and a frame are combined by a hub, and can be fabricated into an efficient product easy to be carried.

PREFERRED EMBODIMENTS OF THE INVENTION

Hereinafter, a preferred embodiment of the present invention is described with reference to the accompanying drawings.

Figure 1:
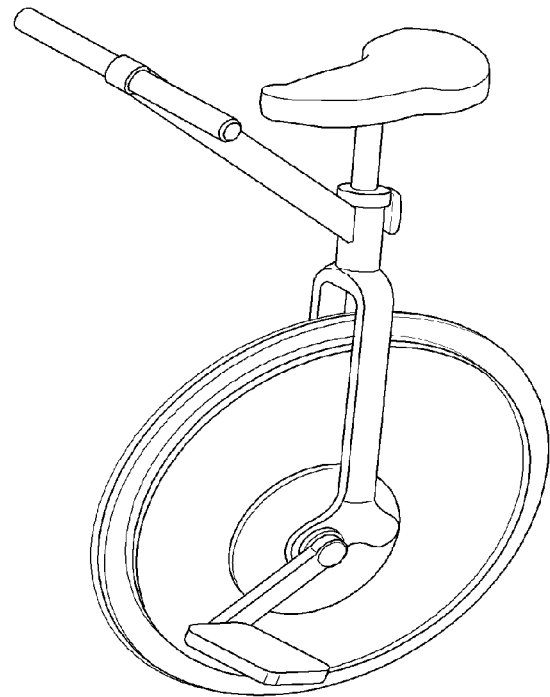
FIG. 1 is a perspective view of a bicycle in accordance with an embodiment of the present invention.
Figure 2:
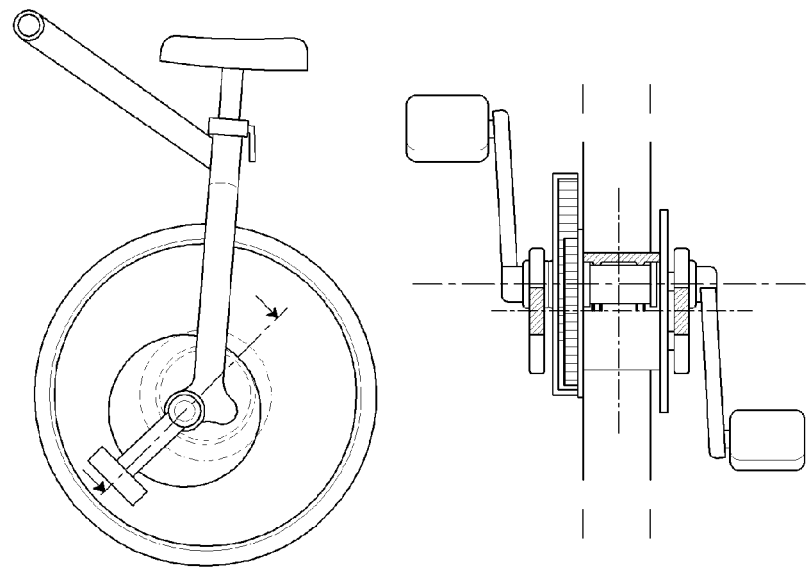
FIG. 2 is a side view of the bicycle and a cross-sectional view of major elements in accordance with an embodiment of the present invention.

As shown in FIG. 2, a bicycle according to the present invention includes a wheel 1 and a frame 5. When a rider presses down pedals 10, the wheel 1 is rotated by a power generation unit.

Figure 3:
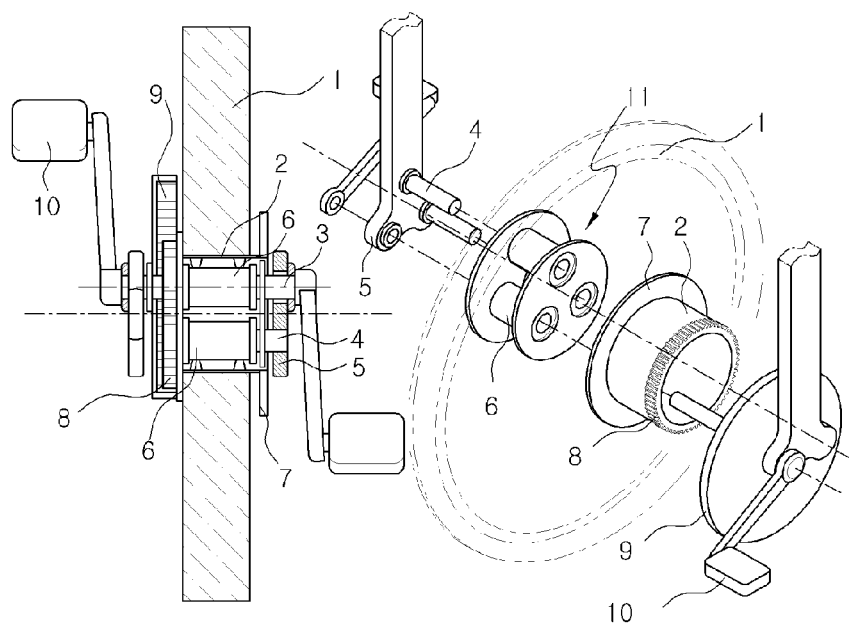
FIG. 3 is a cross-sectional view and an assembly projection view of the bicycle in accordance with an embodiment of the present invention.

As illustrated in FIG. 3 in detail, the power generation unit includes a hub 2 coupled with the center of the wheel 1 and rotated along with the wheel 1 and a plurality of rollers 6 that is installed within the hub 2 and supports the hub 2 in such a way as to be rotated. The plurality of rollers 6 is assembled with respective roller shafts 4, installed on one side of the frame 5, in such a way as to be rotated. That is, the rollers 6 are rotatably coupled with the outer circumference of the roller shafts 4. The rollers 6 may have the form of an individual roller 6, but may have a roller module 11 in which the plurality of rollers 6 is coupled so that a positional relation between the rollers 6 is fixed.

There is a single roller 6 that belongs to the plurality of rollers 6 and that is not assembled with the roller shafts 4. The single roller 6 is rotatably assembled with a pedal shaft 3 coupled with the pedals 10. A pedal-side gear 9 is fixed and coupled on one side of the pedal shaft 3, and the pedal-side gear 9 is engaged with a hub-side gear 8 installed in the hub 2.

As illustrated in a figure on the left of FIG. 3, the pedal-side gear 9 has a diameter greater than the hub-side gear 8. Thus, when the pedal-side gear 9 is rotated once, the hub-side gear 8 is rotated more than once. When the pedals 10 are rotated, the pedal-side gear 9 is rotated, and torque thereof is transferred to the hub-side gear 8 assembled with the hub 2, thereby rotating the wheel 1. A brake disk 7 is mounted on the opposite side of the gears 8 and 9, thus being capable of implementing a brake function. Although not shown, a power generation unit including the hub 2 and the pedal-side gear 9 may include a known free wheel device and a known clutch device.

The operation and effects of the embodiment of the present invention are described with reference to FIG. 4. When a rider presses down the pedals 10, the pedal shaft 3 coupled with the pedals 10 is rotated, and the pedal-side gear 9 fixed to and coupled with one side of the pedal shaft 3 is rotated around the pedal shaft 3. When the pedal-side gear 9 is rotated, the hub-side gear 8 engaged with the pedal-side gear 9 is rotated around the center line of the hub 2, that is, the center of the plurality of rollers 6 or the roller module 11. When the hub-side gear 8 is rotated, the hub 2 fixed to and coupled with the hub-side gear 8 is rotated, the wheel 1 coupled with the hub 2 is rotated, and thus the bicycle moves.

In this case, the weight of the rider applied to the frame 5 (including the weight of the frame 5) presses down the roller 6 through the roller shafts 4 and the pedal shaft 3. Accordingly, the two rollers 6 illustrated on the lower part of FIG. 4 come in contact with the bottom of the inside surface of the hub 5, thereby applying downward force.

Figure 4:
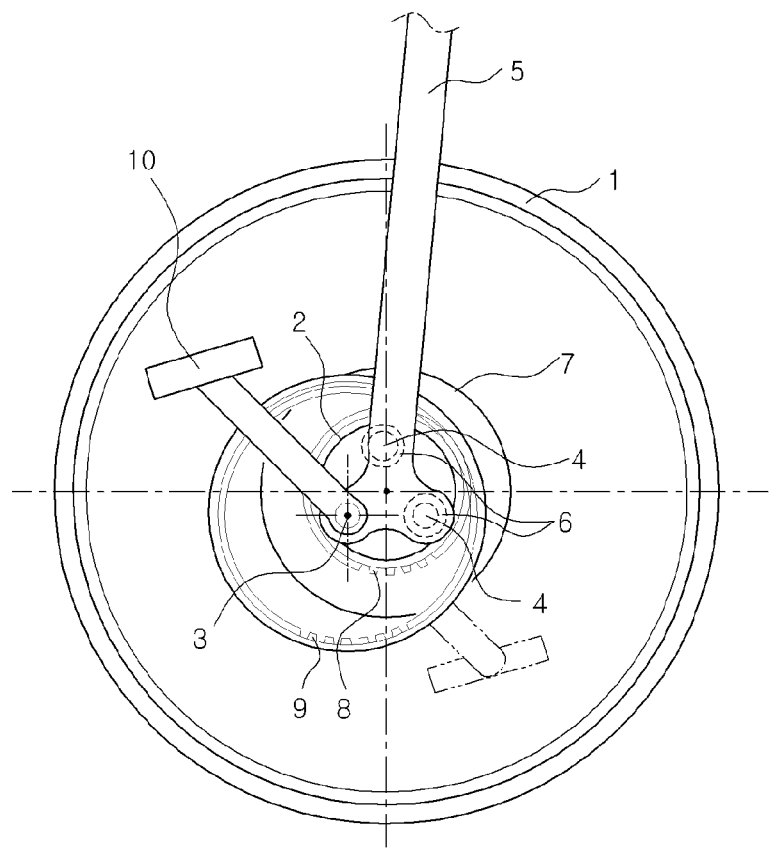
FIG. 4 is a side projection view of the bicycle in accordance with an embodiment of the present invention.
Figure 5:
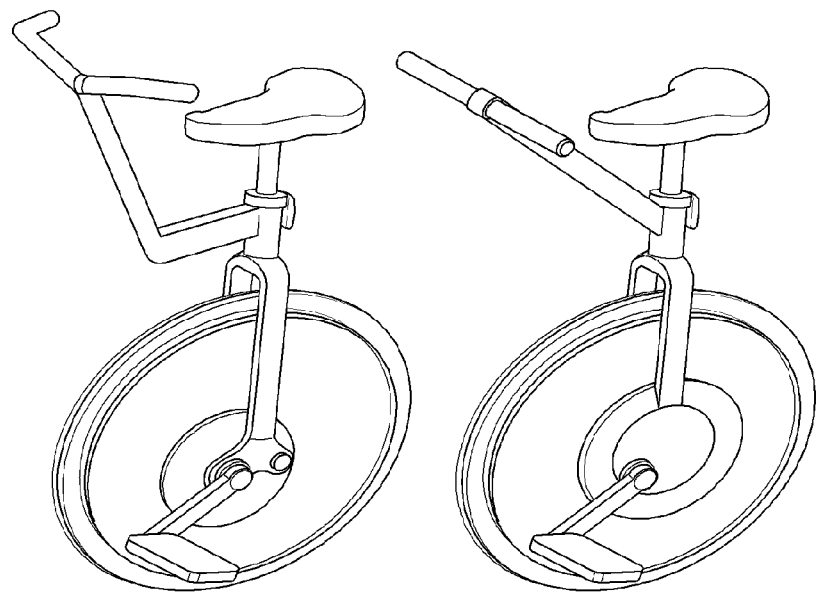
FIG. 5 is a perspective view illustrating a bicycle having different handle shapes according to different embodiments of the present invention.

As described above, points at which the force is applied to the wheel 1, that is, points at which the two rollers 6 on the lower part of FIG. 4 come in contact with the bottom of the inside surface of the hub 5, are placed lower than the center of the wheel 10 and the center of the hub 2. Accordingly, the center of gravity is lower than that of the wheel, and thus a danger that falling may occur can be reduced compared with a prior art in which the weight of a rider is applied to the center of the wheel.

Furthermore, the number of points at which force is applied to the wheel is two or more not one. Accordingly, although the bicycle is slightly inclined forward or backward because a rider is poor at control, the rider can adjust the balance only if the center of gravity of the rider and the frame has only to be placed between two points at which, for example, the two rollers 6 on the lower part of FIG. 4 meet the inside surface of the hub 5.

Furthermore, unlike in a conventional unicycle, the pedal shaft 3 may be placed slightly under the front of the center of the wheel 1 not the center of the wheel 1. Accordingly, pedaling is easy, and it will be help adjust the balance by pressing down the pedals.

Furthermore, the pedal-side gear 9 has a diameter greater than the hub-side gear 8. Accordingly, the speed is fast, and it will be helpful in keeping the balance because the wheel 1 is rotated more than once while the pedals 10 are rotated once.

DESCRIPTION OF REFERENCE NUMERALS wheel (1), hub (2), pedal shaft (3), roller shafts (4), frame (5), roller (6), brake disk (7), hub-side gear (8), pedal-side gear (9), pedal (10), roller module (11)

What is claimed is:

1. A bicycle, wherein a plurality of rollers (6) or a roller module in which the plurality of rollers (6) is coupled is mounted on a hub (2) placed at the center of a wheel (1), the hub (2) is configured to be rotatably moved while being supported by the rollers (6), some rollers (6) of the plurality of rollers (6) are rotatably assembled with a plurality of roller shafts (4) coupled with a frame (5), a single roller (6) that belongs to the plurality of rollers (6) and that is not assembled with the roller shafts (4) is rotatably assembled with a pedal shaft (3) coupled with the pedals (10), a pedal-side gear (9) is fixed to and coupled with the pedal shaft (3), the pedal-side gear (9) is engaged with a hub-side gear (8) installed in the hub (2) wherein when the pedals (10) are rotated and the pedal-side gear (9) is rotated, the hub-side gear (8) is rotated to rotate the wheel (1).

2. The bicycle of claim 1, wherein a power generation unit that drives the wheel comprises one or more of a free wheel device, a clutch device, and a brake device.

3. The bicycle of claim 1, wherein the pedal shaft (3) is assembled with the roller (6) under a front of a center of the hub (2).

* * * * *